United States Patent
Nakamura et al.

(10) Patent No.: US 8,546,465 B2
(45) Date of Patent: Oct. 1, 2013

(54) AQUEOUS INK FOR INKJET

(75) Inventors: Tetsuo Nakamura, Ibaraki-ken (JP); Akiko Tsuchida, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 293 days.

(21) Appl. No.: 12/153,586

(22) Filed: May 21, 2008

(65) Prior Publication Data

US 2008/0293862 A1  Nov. 27, 2008

(30) Foreign Application Priority Data

May 24, 2007 (JP) ................. 2007-138061

(51) Int. Cl.
*C09D 11/08* (2006.01)
*C09D 129/12* (2006.01)

(52) U.S. Cl.
USPC ....... 523/160; 347/100; 106/31.6; 106/31.65; 106/31.75; 106/31.9

(58) Field of Classification Search
USPC ............. 347/100; 523/160; 106/31.6, 31.65, 106/31.75, 31.9
See application file for complete search history.

(56) References Cited

U.S. PATENT DOCUMENTS

| | | | | |
|---|---|---|---|---|
| 6,146,769 A | * | 11/2000 | Anton | 428/500 |
| 2003/0055178 A1 | * | 3/2003 | Gore et al. | 525/242 |

FOREIGN PATENT DOCUMENTS

| | | |
|---|---|---|
| JP | 2001-323190 A | 11/2001 |
| JP | 2002-338859 A | 11/2002 |
| JP | 2003-026940 A | 1/2003 |
| JP | 2003-313389 | 11/2003 |
| JP | 2004-161847 A | 6/2004 |

* cited by examiner

*Primary Examiner* — Robert C Boyle
(74) *Attorney, Agent, or Firm* — Nath, Goldberg & Meyer; Jerald L. Meyer

(57) ABSTRACT

An aqueous ink for an inkjet, comprising a pigment, a polymer compound that coats the pigment, a water-soluble organic solvent, and water, wherein
the polymer compound has a β-diketone group and a cationic salt-forming group, and also includes a cross-linked structure based on a siloxane linkage.

6 Claims, No Drawings

AQUEOUS INK FOR INKJET

CROSS REFERENCE TO RELATED APPLICATIONS

This Application is based upon and claims the benefit of priority from prior Japanese Patent Application No. 2007-138061 filed on May 24, 2007; the entire contents of which are incorporated by reference herein.

BACKGROUND OF THE INVENTION

1. Field of the Invention

The present invention relates to an aqueous ink for an inkjet.

2. Description of the Related Art

An inkjet recording system is a printing system in which printing is conducted by spraying a liquid ink with a high degree of fluidity from a very fine nozzle and adhering the ink onto a recording medium such as a sheet of paper. This system enables the printing of high-resolution, high-quality images at high speed and with minimal noise, using a comparatively inexpensive printing apparatus, and are rapidly becoming widespread.

The colorants for the inks used in the inkjet recording system can be broadly classified into those that use pigments and those that use dyes. Of these, inks that employ a pigment as the colorant tend to be gaining popularity, as they offer the superior levels of light resistance, weather resistance and water resistance required for high-definition printing.

In terms of the solvent used, inks can be broadly classified as either aqueous inks or non-aqueous inks. In an aqueous ink, a water-soluble organic solvent and water act as the ink medium, and dispersing the pigment finely within this medium and then ensuring favorable stability of the resulting dispersion is problematic.

For this reason, an aqueous ink with improved dispersion stability has been proposed in which the pigment is encapsulated within a resin prior to dispersion within the aqueous medium (see Japanese Patent Laid-Open No. 2003-313389).

SUMMARY OF THE INVENTION

However, depending on the nature of the water-soluble organic solvent used within the aqueous ink, and particularly in the case of a low-polarity solvent, the encapsulating resin (the coating resin) may dissolve within the solvent, causing thickening or gelling of the ink.

Accordingly, an object of the present invention is to provide an aqueous ink for an inkjet that is able to maintain a stable dispersed state for a variety of water-soluble organic solvents, and particularly for low-polarity solvents.

A first aspect of the present invention provides an aqueous ink for an inkjet, comprising a pigment, a polymer compound that coats the pigment, a water-soluble organic solvent, and water, wherein the polymer compound has a β-diketone group and a cationic salt-forming group, and also includes a cross-linked structure based on a siloxane linkage.

Another aspect of the present invention provides an aqueous ink for an inkjet, comprising a pigment, a polymer compound that coats the pigment, a water-soluble organic solvent, and water, wherein the polymer compound is a copolymer obtained by reacting monomers including (A) a monomer containing a β-diketone group, (B) a monomer containing a tertiary amino group or a quaternary ammonium group, and (C) a monomer containing an alkoxysilyl group.

Yet another aspect of the present invention provides a printed item that has been printed using the aqueous ink for an inkjet described above.

Yet another aspect of the present invention provides a colorant comprising a pigment coated with a polymer compound that contains a β-diketone group, a cationic salt-forming group, and an alkoxysilyl group.

DETAILED DESCRIPTION OF EMBODIMENTS

In an aqueous ink for an inkjet (hereafter also abbreviated to simply "the ink") according to the present invention, a pigment is coated with a polymer compound that contains a β-diketone group and a cationic salt-forming group, and also includes a cross-linked structure based on a siloxane linkage. This polymer compound forms a stable coating that is resistant to dissolution in a variety of water-soluble organic solvents, and particularly low-polarity solvents. As a result, the present invention is able to provide an ink that exhibits favorable storage stability and pigment dispersibility within a variety of water-soluble organic solvents, and also exhibits excellent discharge characteristics, with no blocking of the nozzles.

An ink according to the present invention comprises a pigment, a polymer compound that coats the pigment, a water-soluble organic solvent, and water.

Here, the expression "coats the pigment" means that by bonding or adsorbing the polymer compound to the pigment, the pigment is at least partially coated by the polymer compound.

Examples of pigments that can be used include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black, and channel black. These pigments may be used either alone, or in combinations of two or more different pigments.

The polymer compound that coats the pigment has a β-diketone group and a cationic salt-forming group, and also includes a cross-linked structure based on a siloxane linkage. This polymer compound functions as a pigment dispersant, and also as a coating resin that coats (encapsulates) the pigment, either partially or in its entirety. In the following description, this polymer compound may also be referred to as "the copolymer" or "the coating resin".

Representative examples of preferred cationic salt-forming groups include tertiary amino groups and quaternary ammonium groups.

The polymer compound is preferably a copolymer obtained by reacting monomers including (A) a monomer containing a β-diketone group, (B) a monomer containing a tertiary amino group or a quaternary ammonium group, and (C) a monomer containing an alkoxysilyl group. At least a portion of the alkoxysilyl groups of the monomer (C) form siloxane linkages under the action of the water in the ink.

There are no particular restrictions on the monomer (A) that contains a β-diketone group ($-COCH_2CO-$), provided it is a monomer that contains at least one β-diketone group within each molecule. Vinyl monomers are preferred, and examples of readily available monomers include 2-(acetoacetoxy)ethyl(meth)acrylate, 2-(acetoacetoxy)propyl (meth) acrylate, (meth)acrylamidoethylacetoxy acetate, and hexadione(meth)acrylate. These monomers may be used either alone, or in a combination containing a plurality of different monomers.

In this description, the term "(meth)acrylic acid" describes both acrylic acid and methacrylic acid, the term "(meth) acrylate" describes both acrylate and methacrylate, and the term "(meth)acrylamide" describes both acrylamide and methacrylamide (this also applies below).

Next is a description of the monomer (B) that contains a tertiary amino group or a quaternary ammonium group.

In terms of achieving a balance between the hydrophilicity and hydrophobicity and the like, the tertiary amino group is preferably a —NRR' group (wherein, R and R' each represent, independently, a lower alkyl group of 1 to 4 carbon atoms).

Examples of monomers that contain this type of tertiary amino group include:

styrenes containing a dialkylamino group, such as N,N-dimethylaminostyrene, N,N-dimethylaminomethylstyrene, N,N-diethylaminostyrene, and N,N-diethylaminomethylstyrene;

(meth)acrylate esters containing a dialkylamino group, such as N,N-dimethylaminoethyl (meth)acrylate, N,N-diethylaminoethyl(meth)acrylate, N,N-dimethylaminopropyl (meth)acrylate, and N,N-diethylaminopropyl(meth)acrylate;

(meth)acrylamides containing a dialkylamino group, such as N-(N',N'-dimethylaminoethyl) (meth)acrylamide, N-(N', N'-diethylaminoethyl)(meth)acrylamide, N-(N',N'-dimethylaminopropyl)(meth) acrylamide, and N-(N',N'-diethylaminopropyl) (meth) acrylamide;

vinylpyridines such as vinylpyridine, 2-methyl-5-vinylpyridine, and 2-ethyl-5-vinylpyridine; and vinyl ethers containing a dialkylamino group, such as 2-dimethylaminoethyl vinyl ether, 2-diethylaminoethyl vinyl ether, 2-dimethylaminopropyl vinyl ether, and 2-diethylaminopropyl vinyl ether.

Of these, vinyl monomers containing a vinyl group are preferred, and from the viewpoint of dispersibility, the vinyl group is preferably a (meth)acrylic group or meth(acrylamide) group. A (meth)acrylate ester that contains a dialkylamino group is particularly desirable. These monomers may be used either alone, or in a combination containing a plurality of different monomers.

Examples of monomers containing a quaternary ammonium group include methacryloylaminopropyltrimethylammonium chloride, methacryloyloxyethyltrimethylammonium chloride, methacryloyloxyethyltrimethylammonium methylsulfate, methacryloylaminopropyltrimethylammonium methylsulfate, methacryloyloxyethyldimethylbenzylammonium chloride, methacryloyloxyethyldimethylethylammonium ethylsulfate, methacryloyloxyethyltrimethylammonium p-toluenesulfonate, methacryloylaminopropyldimethylbenzylammonium chloride, methacryloylaminopropyldimethylethylammonium ethylsulfate, and methacryloylaminopropyltrimethylammonium p-toluenesulfonate. These compounds are available commercially, for example, from MRC Unitec Co., Ltd.

Examples of the monomer (C) that contains an alkoxysilyl group include γ-(meth)acryloxyethyltrimethoxysilane, γ-(meth)acryloxypropyltrimethoxysilane, γ-(meth)acryloxypropyltriethoxysilane, γ-(meth)acryloxypropyltripropoxysilane, γ-(meth)acryloxypropylmethyidimethoxysilane, γ-(meth)acryloxypropylmethyidiethoxysilane, γ-(meth)acryloxypropylmethyidipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-, (meth)acryloxypropyldimethylethoxysilane, γ-(meth)acryloxypropylphenylmethylmethoxysilane, γ-(meth)acryloxypropylphenylmethylethoxysilane, vinyltrimethoxysilane, vinyltriethoxysilane, p-styryltrimethoxysilane, γ-glycidoxytrimethoxysilane, γ-glycidoxytriethoxysilane, glycidyltrimethoxysilane, glycidyltriethoxysilane, 3-aminopropyltrimethoxysilane, 3-aminopropyltriethoxysilane, 3-isocyanatopropyltrimethoxysilane, and 3-isocyanatopropyltriethoxysilane. These monomers may be used either alone, or in a combination containing a plurality of different monomers. Here, "acryloxy" is synonymous with "acryloyloxy"

The polymer compound comprises the above monomers (A), (B) and (C), but may also include other polymerizable monomers. Examples of these other monomers include (meth)acrylic acid; (meth)acrylate esters such as methyl (meth)acrylate, ethyl (meth)acrylate, propyl(meth)acrylate, hydroxyethyl(meth)acrylate, butyl(meth)acrylate, t-butylaminoethyl(meth)acrylate, allyl(meth)acrylate, 2-(meth) acryloyloxyethylisocyanate, glycidyl(meth)acrylate, benzyl (meth)acrylate, and toluyl(meth)acrylate; styrene-based monomers such as styrene and α-methylstyrene; as well as maleate esters, fumarate esters, (meth)acrylonitrile, vinyl acetate, and α-olefins. These other monomers may be used either alone, or in a combination containing two or more different monomers. Of the above monomers, the use of monomers containing an aromatic ring such as benzyl(meth) acrylate is preferred, as it improves the adsorption of the copolymer to the pigment.

The proportion of each of the monomers (A), (B) and (C) within the combined total of all the monomers is preferably from 5 to 40% by weight for the monomer (A), from 5 to 30% by weight for the monomer (B), and from 0.1 to 30% by weight for the monomer (C). These proportions are even more preferably from 5 to 35% by weight for the monomer (A), from 5 to 20% by weight for the monomer (B), and from 0.1 to 10% by weight for the monomer (C), and are most preferably from 10 to 30% by weight for the monomer (A), from 5 to 10% by weight for the monomer (B), and from 3 to 5% by weight for the monomer (C).

The polymer compound can be synthesized by copolymerizing the type of monomer mixture described above using a conventional radical polymerization process or the like. The reaction is preferably conducted as either a solution polymerization or a dispersion polymerization. The copolymerization may be conducted as a typical random polymerization, and although the copolymer may include partial block units, there is no requirement for any regularity within the copolymer.

Although there are no particular restrictions on the molecular weight (the weight average molecular weight) of the polymer compound, values within a range from about 10,000 to about 300,000 are preferred, and values from about 50,000 to about 200,000 are particularly desirable. If the molecular weight of the polymer compound is too low, then the pigment dispersibility may deteriorate, causing a deterioration in the storage stability, whereas if the molecular weight is too high, the ink viscosity may increase, causing a deterioration in the discharge properties.

In order to ensure that the molecular weight of the polymer dispersant following polymerization falls within the preferred range described above, a chain transfer agent may be used during the polymerization. Examples of this chain transfer agent include thiols such as n-butyl mercaptan, lauryl mercaptan, stearyl mercaptan and cyclohexyl mercaptan.

Examples of the polymerization initiator include conventional heat polymerization initiators, including azo compounds such as AIBN (azobisisobutyronitrile) and 2,2'-azobis (2,4-dimethylvaleronitrile) (V-65, manufactured by Wako Pure Chemical Industries, Ltd.), and peroxides such as t-butyl peroxybenzoate and t-butylperoxy-2-ethylhexanoate (Perbutyl O, manufactured by NOF Corporation). Alternatively, a photopolymerization initiator may be used in which irradiation with an active energy beam is used to generate radicals.

The solvent used during the polymerization is preferably a polar organic solvent. Examples include aliphatic alcohols such as methanol, ethanol and (iso)propanol; ketones such as acetone, methyl ethyl ketone and methyl isobutyl ketone; and esters such as ethyl acetate.

The polymerization conditions vary depending on the nature of the monomers and polymerization initiator, but an example of preferred conditions involves conducting the polymerization under an inert gas atmosphere, at a polymerization temperature of 30 to 120° C., for a period of 2 to 20 hours.

During the polymerization reaction, other typically used additives such as polymerization inhibitors, polymerization promoters and dispersants may also be added to the reaction system.

The coating of the pigment by the synthesized polymer compound is preferably conducted by dispersing the pigment and the polymer compound within a suitable solvent. The dispersion solvent used may simply employ the solvent used during the polymerization of the polymer compound. A conventional dispersion device such as a rocking mill, beads mill, disper mixer, homomixer, colloid mill, ball mill, attritor, sand mill or high-pressure homogenizer may be used to aid dispersion.

In order to ensure re-dispersion of aggregated pigment (complexes), the dispersion comprising the pigment, the polymer compound and the solvent is preferably irradiated with ultrasound using an ultrasonic homogenizer following initial dispersion.

An alternative method for obtaining the pigment (the pigment complex or pigment derivative) involves mixing the monomer (C) and the pigment within a solvent, thereby adsorbing the monomer (C) to the pigment, and subsequently mixing and dispersing this pigment dispersion with an intermediate polymer compound obtained by copolymerizing the monomer (A) and the monomer (B) (and any other copolymerizable monomers that may be used). This method enables the synthesis of the polymer compound and the coating of the pigment to be conducted simultaneously. This method is preferred as it enables the coating resin to adsorb particularly powerfully to the pigment. Besides the monomer (A) and the monomer (B), the intermediate polymer compound preferably comprises a monomer that includes a functional group that is capable of reacting with the pigment-adsorbed monomer (C), such as an epoxy group, isocyanate group, thiol group, amino group, carboxyl group or hydroxyl group. On the other hand, the monomer (C) that is adsorbed to the pigment preferably includes a reactive group such as an amino group, thiol group, epoxy group or isocyanate group that will react with the above functional group.

The method used for adsorbing the monomer (C) to the pigment surface (the pretreatment) may employ either a wet method or a dry method. In terms of enabling a more continuous treatment, the use of a wet method is preferred.

The average particle size of the obtained colorant (the pigment complex) is preferably not greater than approximately 500 nm, even more preferably not greater than 200 nm, and is most preferably 150 nm or less. On the other hand, in order to suppress strike-through within the printed item, the average particle size is preferably at least approximately 50 nm. The average particle size of the pigment complex can be measured using a dynamic light scattering particle size distribution apparatus LB-500 manufactured by Horiba, Ltd., using an aqueous dispersion with a concentration of 0.1% by weight in the case of a black pigment complex, or an aqueous dispersion with a concentration of 1% by weight in the case of a pigment complex other than black.

The ratio between the pigment and the polymer compound (the coating resin) within the colorant, reported as a weight ratio, preferably results in a value within a range from about 0.1 to about 2, and even more preferably from 0.2 to 1 for the coating resin, relative to a value of 1 for the pigment.

The method described above yields a colorant comprising a pigment coated with a polymer compound that contains a β-diketone group, a cationic salt-forming group, and an alkoxysilyl group. By forming cationic salts within the ink, this colorant-coating polymer compound functions as a cationic pigment dispersant. Compared with anionic dispersants, cationic dispersants offer the advantage of superior dispersion stability. The counter ions for the cationic salts of the polymer compound are preferably ions such as sulfonate groups or alkyl sulfate groups that contain no halide ions, as this results in a more environmentally friendly ink.

In order to enable the formation of cationic salts within the ink, the tertiary amino group of the above monomer (B) must become a quaternary ammonium group (namely, —NRR'R"$^+$ or —NHRR'$^+$; wherein R through R" each represent an arbitrary alkyl group) within the ink under the action of a quaternizing agent or neutralizing agent. Here, the term "quaternizing agent" describes a reaction reagent used for forming a $R_4N^+$ type compound (the above —NRR'R"$^+$), whereas a "neutralizing agent" describes a reaction reagent used for forming a $R_3HN^+$ type compound (the above —NHRR'$^+$).

Examples of the neutralizing agent include inorganic acids such as hydrochloric acid, sulfuric acid and phosphoric acid; and organic acids such as acetic acid, propionic acid, lactic acid, succinic acid, glycolic acid, gluconic acid and glyceric acid.

There are no particular restrictions on the quaternizing agent, and examples include alkyl halides such as 2-bromopropane, 2-bromobutane, 2-iodobutane, 2-fluoropentane and tert-butyl bromide; benzyl halides such as benzyl chloride and benzyl bromide; and dialkyl sulfates such as dimethyl sulfate and diethyl sulfate.

The ratio between the number of mols of amino groups and the number of mols of the quaternizing agent or neutralizing agent preferably yields at least 0.8 mols, and even more preferably at least 0.9 mols of the quaternizing agent or neutralizing agent per 1 mol of amino groups. Using an equimolar ratio of 1:1 in order to achieve a quatemization rate of substantially 100% is the most desirable.

The tertiary amino group of the above monomer (B) may be converted to a cationic salt (a quaternary ammonium salt) using an arbitrary quaternizing agent or neutralizing agent following synthesis of the polymer compound, or may be converted to a cationic salt while still a monomer, with the resulting cationic salt-containing monomer (B) then supplied to the copolymerization.

According to the findings of the inventors of the present invention, if a low-polarity solvent such as an ether-based solvent is used as the water-soluble organic solvent within an ink, then the coating resins employed in conventional encapsulated pigments are prone to dissolution within the low-polarity solvent of the ink. This dissolution of the resin causes a deterioration in the pigment dispersibility and the storage stability. Furthermore, in those cases where the counter ion used when forming a salt with the cationic salt-forming group is a polyvalent ion, this polyvalent ion can cause cross-linking between molecules of the polymer compound, increasing the likelihood of the ink gelling.

The description of cases where the counter ion is a polyvalent ion includes those cases where a monovalent ion readily becomes a polyvalent ion via hydrolysis. Specifically, in those cases where dimethyl sulfate is used as the quaternizing agent, the counter ion is the methylsulfate ion ($CH_3OSO_3^-$). Because this methylsulfate ion readily converts to a sulfate ion by hydrolysis, this case is treated as though the counter ion were a polyvalent ion.

It is thought that because the polymer compound used in the present invention includes the monomer (A) and the monomer (C), namely because it contains a β-diketone group and an alkoxysilyl group, dissolution of the coating resin within the solvent is inhibited, although the specifics of the actions that yield this results are not entirely clear.

It is thought that the presence of the β-diketone group inhibits cross-linking caused by the aforementioned polyvalent ions.

Moreover, if the coating resin dissolves in the water-soluble organic solvent, then it is thought that when, for example, the water evaporates from residual ink sitting within the nozzle of an inkjet recording apparatus, a resin film is formed within the nozzle that can cause a nozzle blockage. However, with the ink of the present invention, because dissolution of the coating resin is suppressed, even if the moisture evaporates from the ink, solidification of the ink is prevented, with the ink retaining its fluidity. Moreover, with the ink of the present invention, if fresh ink is mixed with a quantity of ink from which the moisture has already evaporated, then the colorant exhibits favorable re-dispersibility. Accordingly, even if ink from which the water has evaporated remains within the nozzle, when printing is recommenced, favorable printing can be achieved immediately, indicating a superior level of printing stability.

The blend quantity of the colorant (solid fraction) within the ink is preferably within a range from about 0.1 to about 25% by weight, even more preferably from 1 to 20% by weight, and is most preferably from 5 to 15% by weight.

Examples of water-soluble organic solvents that can be used within the ink include organic compounds that are liquid at room temperature and soluble in water. Specific examples include lower alcohols such as methanol, ethanol, 1-propanol, isopropanol, 1-butanol, 2-butanol, isobutanol, and 2-methyl-2-propanol; glycols such as ethylene glycol, tetraethylene glycol, pentaethylene glycol, propylene glycol, dipropylene glycol, and tripropylene glycol; glycerol; acetins (monoacetin, diacetin, and triacetin); glycol ethers such as triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; as well as triethanolamine and sulfolane. Low molecular weight polyalkylene glycols, including polyethylene glycols with an average molecular weight within a range from 190 to 630, such as an average molecular weight of 200, 300, 400, or 600, polypropylene glycol diols with an average molecular weight within a range from 200 to 600, such as an average molecular weight of 400, and polypropylene glycol triols with an average molecular weight within a range from 250 to 800, such as an average molecular weight of 300 or 700, can also be used. These water-soluble organic solvents may be used either alone, or in combinations of two or more different solvents.

Of these, the use of a low-polarity organic solvent such as a lower alkyl ether of a polyhydric alcohol is preferred in the present invention, and the use of glycol ethers is particularly desirable. In particular, the solvent is preferably selected from amongst ethylene glycol mono-n-butyl ether, diethylene glycol mono-n-butyl ether, triethylene glycol mono-n-butyl ether, propylene glycol mono-n-butyl ether, and dipropylene glycol mono-n-butyl ether. These solvents may be used either alone, or in combinations of two or more different solvents.

The quantity of the water-soluble organic solvent within the ink is preferably within a range from about 15 to about 40% by weight.

Water preferably represents from about 30 to about 80% by weight of the ink. The water used is preferably a pure water or ultra pure water such as an ion-exchanged water or distilled water.

The ideal range for the ink viscosity varies depending on factors such as the diameter of the discharge head nozzles and the discharge environment, but at 23° C. is typically within a range from 1 to 30 mPa·s, and even more preferably from 5 to 15 mPa·s. A viscosity of approximately 10 mPa·s is suitable for use with inkjet recording devices. Here, the viscosity is measured at 23° C. by raising the shear stress from 0 Pa at a rate of 0.1 Pa/s, and refers to the measured value at 10 Pa.

If required, any of the various additives typically used within the field may be added to the ink, provided the inclusion of these additives does not impair the object of the present invention.

Specific examples of these additives include anionic surfactants, cationic surfactants, amphoteric surfactants, non-ionic surfactants, or polymer-based, silicone-based or fluorine-based surfactants, which are added to the ink as pigment dispersants, antifoaming agents, or surface tension reducing agents or the like.

An electrolyte may also be added to the ink to regulate the viscosity of the ink. Examples of these electrolytes include sodium sulfate, potassium hydrogen phosphate, sodium citrate, potassium tartrate and sodium borate, and two or more of these electrolytes may also be used in combination. Compounds such as sulfuric acid, nitric acid, acetic acid, sodium hydroxide, potassium hydroxide, ammonium hydroxide and triethanolamine may also be used as ink thickening assistants.

By adding an antioxidant to the ink, oxidation of the ink components can be prevented, enabling the storage stability of the ink to be improved. Examples of typical antioxidants include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented, enabling the storage stability of the ink to be improved. Examples of typical preservatives include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitropropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

A printed item according to the present invention is an item printed by an inkjet recording method using the ink of the present invention described above. The inkjet printer may employ any of various printing systems, including a piezo system, electrostatic system or thermal system, and based on a digital signal, discharges the ink according to the present invention from the inkjet head, and adheres the discharged ink droplets to a recording medium.

EXAMPLES

A more detailed description of the present invention is provided below based on a series of examples, although the present invention is in no way limited by these examples. In the following description, the units "% by weight" are recorded simply as "%", and the units "parts by weight" are recorded simply as "parts".

<Synthesis of Polymer Compound>

The monomer mixtures shown in Table 1 and Table 2 were copolymerized in the manner described below, using a quaternizing agent or neutralizing agent, thereby producing a series of polymer compounds P1 to P15. The reagents used are listed below.

(1) Monomer (A)

AAEM: acetoacetoxyethyl methacrylate:

$CH_2=C(CH_3)COOCH_2CH_2OCOCH_2COCH_3$ (2) Monomer (B)

DMAEMA: dimethylaminoethyl methacrylate:

$CH_2=C(CH_3)COOCH_2CH_2N(CH_3)_2$

DEAEMA: diethylaminoethyl methacrylate:

$CH_2=C(CH_3)COOCH_2CH_2N(CH_2CH_3)_2$

DMAPMA: dimethylaminopropylmethacrylamide:

$CH_2=C(CH_3)CONHCH_2CH_2CH_2N(CH_3)_2$ (3) Monomer (C)

Y-9936: γ-triethoxysilylpropyl methacrylate:

$CH_2=C(CH_3)COOCH_2CH_2CH_2Si(OCH_2CH_3)_3$

KBE-403: 3-glycidoxypropyltrimethoxysilane (4) Other Copolymerizable Monomers

BzMA: benzyl methacrylate

MMA: methyl methacrylate t-BAEM: t-butylaminoethyl methacrylate (5) Quaternizing Agents DMS: dimethyl sulfate BzCl: Benzyl chloride

TABLE 1

| Polymer compound | Blend monomers (% by weight) | | | | | | | | |
|---|---|---|---|---|---|---|---|---|---|
| | Monomer A | Monomer B | | | Monomer C | Other monomers | | Quaternizing agent | |
| | AAEM | DMAEMA | DEAEMA | DMAPMA | Y-9936 | BzMA | MMA | DMS | BzCl |
| P1 | 20 | 7 | | | 3 | 20 | 50 | 5.62 | |
| P2 | 20 | 5 | | | 3 | 20 | 52 | 4.01 | |
| P3 | 17 | | 8 | | 3 | 20 | 52 | 5.45 | |
| P4 | 15 | | | 10 | 3 | 20 | 52 | 7.41 | |
| P5 | 10 | 7 | | | 3 | 20 | 60 | 5.62 | |
| P6 | 30 | 7 | | | 3 | 20 | 40 | 5.62 | |
| P7 | 20 | 7 | | | 5 | 20 | 48 | 5.62 | |
| P8 | 20 | | | | 3 | 20 | 57 | | |
| P9 | | 7 | | | 3 | 20 | 70 | 5.62 | |
| P10 | 20 | 7 | | | | 20 | 53 | 5.62 | |
| P11 | | 7 | | | | 20 | 73 | 5.62 | |
| P12 | 20 | 7 | | | 3 | 20 | 50 | | |
| P13 | 20 | 7 | | | 3 | 20 | 50 | | 5.64 |

| Polymer compound | Polymer compound | | | Ink | | | |
|---|---|---|---|---|---|---|---|
| | Neutralizing agent Sulfuric acid | Molecular weight (×10⁴) | Solvent resistance | | Storage stability | Fluidity after water evaporation | Discharge properties |
| P1 | | 16.0 | A | Example 1 | A | A | A |
| P2 | | 13.2 | A | Example 2 | A | A | A |
| P3 | | 13.5 | A | Example 3 | A | A | A |
| P4 | | 14.7 | A | Example 4 | A | A | A |
| P5 | | 16.2 | A | Example 5 | A | A | A |
| P6 | | 15.7 | A | Example 6 | A | A | A |
| P7 | | 15.3 | A | Example 7 | A | A | A |
| P8 | | 12.1 | A | Comparative example 1 | Dispersion not produced | | |
| P9 | | 13.6 | A | Comparative example 2 | B | C | C |
| P10 | | 16.4 | B | Comparative example 3 | B | A | C |
| P11 | | 15.4 | C | Comparative example 4 | C | C | C |
| P12 | 4.37 | 16.0 | B | Example 8 | B | B | B |
| P13 | | 12.1 | A | Example 9 | A | A | A |

TABLE 2

| | Blend monomers (% by weight) | | | | | Quaternizing agent | Polymer compound | | | Ink | | |
|---|---|---|---|---|---|---|---|---|---|---|---|---|
| Polymer compound | Monomer A | Monomer B | Monomer C | Other monomers | | | Molecular weight | Solvent resistance | | Storage stability | Fluidity after water evaporation | Discharge properties |
| | AAEM | DMAEMA | KBE-403 | BzMA | t-BAEM | DMS | (×10⁴) | | | | | |
| P14 | 20 | 7 | 10 | 20 | 5 | 5.62 | 13.6 | A | Example 10 | A | A | A |
| P15 | 20 | 7 | 20 | | 5 | 5.62 | 14.2 | A | Example 11 | A | A | A |

(Polymer Compound Synthesis Method 1)

A four-necked flask was charged with a total of 100 parts of the monomers used in forming the polymer compound as shown in Table 1, together with 50 parts of methyl ethyl ketone (MEK), 50 parts of ethanol, and 1 part of a polymerization initiator (AIBN). Using a nitrogen flow rate of 100 ml/minute, nitrogen was bubbled through the reaction mixture for 30 minutes at room temperature to replace the dissolved oxygen within the liquid with nitrogen. Subsequently, the system was heated to 75° C. and the polymerization was initiated. 3.5 hours after polymerization initiation, 0.5 parts of a polymerization initiator (V-65) and 10 parts of MEK were added to reduce the quantity of unreacted monomers. 4 hours after polymerization initiation, 30 parts of MEK was added and the polymerization reaction was halted.

With the reaction system held at 70° C., a mixed liquid of the quaternizing agent DMS or BzCl and 50 parts of ethanol was added dropwise to the system over a period of about 30 minutes, and following completion of the dropwise addition, the reaction was continued for a further one hour, thereby converting the tertiary amino groups of the polymer compound to quaternary ammonium groups (the molar ratio of amine to quaternizing agent was approximately 1:1).

All the polymer compounds except the compound P12 were synthesized using this synthesis method 1 (although in the case of P8, the quaternizing agent was not used).

(Polymer Compound Synthesis Method 2)

A polymerization reaction was conducted in the same manner as the synthesis method 1 described above, and following completion of the polymerization reaction, 4.37 parts of the neutralizing agent sulfuric acid was added, thereby neutralizing the tertiary amino groups of the polymer compound (the molar ratio of amine to neutralizing agent was approximately 1:1). The polymer compound P12 was prepared using this synthesis method 2.

<Colorant (Pigment Complex) Preparation Method 1>

Using a drying-in-liquid process, and using the polymer compounds shown in Table 1, colorant dispersions were prepared in the manner described below.

A rocking mill (RM-05, manufactured by Seiwa Giken Co., Ltd.) was charged with 2 parts of the prepared polymer compound (solid fraction), 4 parts of a pigment (carbon black: S160 manufactured by Degussa A G), 5 parts of MEK, 5 parts of ethanol, and 20 parts of distilled water, and using 100 parts of beads (diameter: 0.5 mm), the mixture was dispersed for one hour at 67.50 Hz. The thus obtained dispersion was then cooled, and under constant stirring, was subjected to irradiation with ultrasound using an ultrasonic homogenizer (VC750, manufactured by Sonic & Materials Inc.).

Subsequently, the organic solvent was stripped from the dispersion using an evaporator under both heat and reduced pressure, yielding an aqueous dispersion containing the colorant (solid fraction: 15.4%).

<Colorant (Pigment Complex) Preparation Method 2>

Using the monomers and quaternizing agent shown in Table 2, colorant dispersions were prepared in the manner described below.

200 parts of the pigment, and the KBE-403 (manufactured by Shin-Etsu Silicones Co., Ltd.) that acts as the monomer (C) were mixed with 500 parts of MEK and 500 parts of ethanol, and the mixture was then reacted at 70° C. for 12 hours, thereby pre-treating the pigment. Meanwhile, using those monomers other than the monomer (C) in Table 2 that constitute the polymer compound, an intermediate polymer compound was produced in the same manner as that described in the synthesis example 1. The pretreated pigment and the intermediate polymer compound were then mixed together and reacted for 4 hours at 70° C. Subsequently, an additional 1,000 parts of water was added, and following ultrasonic irradiation in the same manner as that described for the example 1, the solvent was stripped, yielding an aqueous dispersion containing the colorant.

<Preparation of Inks>

Using the prepared colorants, inks were prepared using the formulations listed below.

Colorant (solid fraction): 12.75 parts (comprising 8.5 parts of the pigment and 4.25 parts of the polymer compound (P1 to P15))

Glycerol: 10 parts

Triethylene glycol monobutyl ether: 20 parts

Surfactant (acetylene glycol ethylene oxide, "Surfinol 465", manufactured by Air Products and Chemicals Inc.): 2 parts Water: 55.25 parts

EXAMPLES AND COMPARATIVE EXAMPLES

By using the blend formulation described above and varying the colorant, inks of the examples and comparative examples shown in Table 1 and Table 2 were prepared.

<Evaluation of Properties>

(1) Molecular Weight of the Polymer Compound

Measurement of the weight average molecular weight of each of the prepared polymer compounds was conducted by gel permeation chromatography (GPC) in the manner described below. The polymer compound was isolated by drying at room temperature to the remove the solvent, and the weight average molecular weight of the polymer compound was then measured by GPC against polystyrene standards, using a 20 mM lithium bromide-containing dimethylformamide as the solvent, a flow rate of 0.8 ml/minute, and a RID detector. The measurement apparatus was manufactured by Shimadzu Corporation, and the column comprised Shodex GPC KD-804 and KD-805 columns (manufactured by Showa Denko K. K.) linked in series.

(2) Solvent Resistance of the Polymer Compound

The synthesized polymer compound was dried at 105° C., and 10 parts of the solid-state polymer compound was then sampled and immersed within 100 parts of triethylene glycol monobutyl ether. Following immersion in the solvent at 70° C. for a period of 12 hours, 0.05 ml of the solvent was extracted, and a determination as to whether the polymer compound had dissolved within the solvent was made by conducting an aforementioned GPC measurement.

Polymer compounds which underwent no dissolution were evaluated as A, polymer compounds which dissolved completely were evaluated as C, and polymer compounds which dissolved partially were evaluated as B.

(3) Ink Storage Stability

Each ink was placed in a sealed container and stored for 4 weeks at 70° C., and the viscosity of the colorant (the pigment complex) was then measured. The viscosity was measured using a rheometer (Rheostress RS75, manufactured by Haake GmbH). Inks for which the viscosity variation was within 10% were evaluated as A, inks which gelled, making measurement impossible, were evaluated as C, and inks for which measurement was possible, but for which the viscosity variation exceeded 10% were evaluated as B.

(4) Ink Fluidity Following Water Evaporation

Each ink was left to stand for one week in an open environment at a room temperature of 45° C. and a humidity of 30%, and the fluidity of the ink was then evaluated. Inks which retained fluidity and had a viscosity of not more than 1 Pa·s were evaluated as A, inks which retained fluidity but had a viscosity exceeding 1 Pa·s were evaluated as B, and inks which gelled or exhibited absolutely no fluidity were evaluated as C.

(5) Ink Discharge Properties

The ink discharge properties were investigated using a piezo inkjet recording head with a nozzle diameter of 25 μm and a recording resolution of 300 dpi.

Discharge was first conducted with fresh ink in an atmosphere at a room temperature of 23° C. and a humidity of 50%, and the apparatus was then allowed to stand for one hour with the ink still installed. Ink discharge was then recommenced without performing a recording head cleaning operation, and the state of the discharge was inspected and evaluated using the following criteria.

A: when the fresh ink was discharged, no missing nozzles (nozzles from which discharge did not occur) were observed, and discharge was possible from the first dot. After standing, discharge was able to be recommenced with no missing nozzles.

B: when the fresh ink was discharged, no missing nozzles were observed, and discharge was possible from the first dot. After standing, several missing nozzles were noted.

C: when the fresh ink was discharged, non-discharging nozzles existed from the outset.

The results obtained are summarized in Table 1 and Table 2.

As can be seen from the inks of the above examples, the present invention is able to provide an ink that exhibits improved pigment dispersion stability, resulting in superior storage stability and favorable discharge properties, even when a low-polarity ether-based organic solvent is used as the water-soluble organic solvent.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous ink for an inkjet, comprising:
   a pigment;
   a polymer compound that coats the pigment, the polymer compound being a copolymer obtained by reacting monomers comprising
      (a) a monomer comprising a β-diketone group and which is present in an amount of from 10 to 30% by weight of total weight of the monomers,
      (b) a monomer comprising a tertiary amino group or a quaternary ammonium group and which is present in an amount of from 5 to 10% by weight of total weight of the monomers, and
      (c) a monomer comprising an alkoxysilyl group and which is present in an amount of from 3 to 5% by weight of total weight of the monomers;
   a water-soluble organic solvent; and
   water.

2. The aqueous ink for an inkjet according to claim 1, wherein the water-soluble organic solvent is a lower alkyl ether of a polyhydric alcohol.

3. A printed item, printed using the aqueous ink for an inkjet according to claim 1.

4. The aqueous ink for an inkjet according to claim 1, wherein the pigment coated with the polymer compound has an average particle size of at least 50 nm.

5. A colorant, comprising;
   a pigment coated with a polymer compound that comprises a β-diketone group, a cationic salt-forming group, and an alkoxysilyl group, the polymer compound being a copolymer obtained by reacting monomers comprising
      (a) a monomer comprising a β-diketone group and which is present in an amount of from 10 to 30% by weight of total weight of the monomers,
      (b) a monomer comprising a tertiary amino group or a quaternary ammonium group and which is present in an amount of from 5 to 10% by weight of total weight of the monomers, and
      (c) a monomer comprising an alkoxysilyl group and which is present in an amount of from 3 to 5% by weight of total weight of the monomers.

6. The colorant according to claim 5, wherein the pigment coated with the polymer compound has an average particle size of at least 50 nm.

* * * * *